United States Patent [19]

Hirayama

[11] Patent Number: 5,592,671

[45] Date of Patent: Jan. 7, 1997

[54] RESOURCE MANAGEMENT SYSTEM AND METHOD

[75] Inventor: Hideaki Hirayama, Kawasaki, Japan

[73] Assignee: Kabushiki Kaisha Toshiba, Kawasaki, Japan

[21] Appl. No.: 583,484

[22] Filed: Jan. 5, 1996

Related U.S. Application Data

[63] Continuation of Ser. No. 204,507, Mar. 2, 1994, abandoned.

[30] Foreign Application Priority Data

Mar. 2, 1993 [JP] Japan .................... 5-041470

[51] Int. Cl.$^6$ .................................. G06F 15/16
[52] U.S. Cl. .................................. 395/674
[58] Field of Search .................. 395/650, 800; 364/228.1, 230.1, 281.8, DIG. 1

[56] References Cited

U.S. PATENT DOCUMENTS

| | | | |
|---|---|---|---|
| 4,796,178 | 1/1989 | Jennings et al. | 395/630 |
| 4,985,831 | 1/1991 | Dulong et al. | 395/650 |
| 5,109,512 | 4/1992 | Bahr et al. | 395/650 |
| 5,202,991 | 4/1993 | Gamache et al. | 395/650 |
| 5,241,676 | 8/1993 | Kubo | 395/650 |
| 5,452,452 | 9/1995 | Gaetner et al. | 395/650 |

*Primary Examiner*—Eric Coleman
*Assistant Examiner*—John Harrity
*Attorney, Agent, or Firm*—Cushman, Darby & Cushman; IP Group of Pillsbury; Madison & Sutro LLP

[57] ABSTRACT

A multiprocessor system includes a plurality of processors each of which selects one resource from a plurality of executable resources and processes the selected resource. A memory stores priority levels of the executable resources for each of the processors. A resource selector selects a resource to be processed by each of the processors from among the executable resources, on the basis of the priority levels stored in the memory. A resource is selected based on a highest priority level corresponding from among the executable resources. Executable resources are processes or pages of a memory.

12 Claims, 7 Drawing Sheets

RESOURCE MANAGEMENT SYSTEM AND METHOD

This is a continuation of application Ser. No. 8/204,507, filed on Mar. 2, 1994, which was abandoned upon the filing hereof.

BACKGROUND OF THE INVENTION

1. Field of the Invention

This invention relates to a system and method for managing resources such as processes or memories in a computer system containing resources and entities that operate the resources.

2. Description of the Related Art

The history of computer systems started with simple single processors and has been developing into small-scale multiprocessor systems containing several processors. The types of multiprocessor systems include the UMA (Uniform Memory Access) type where the access time required for each processor to access each memory is uniform, and the NORMA (No Remote Memory Access) type where each processor can access local memories only. For instance, a common memory multiprocessor system called "Dash" has been disclosed in an article titled "The Stanford Dash Multiprocessor," IEEE COMPUTER, March, 1992. Since conventional operating systems, particularly systems for managing resources such as processes or memories, have still been employing a resource management method using a simple single processor, they have the disadvantage of being unable to perform resource management efficiently on a multiprocessor system. Specifically, with a conventional multi-processor system composed of n processors, each process has the same priority when viewed from any processor. Consequently, each of the n processors attempts to carry out the same process. This permits a single process to be effected by more than one processor. However, because each processor has its own cache memory, each time the same process is executed by more than one processor, the contents of each cache memory must be copied back, which not only makes the processing complicated, but also fails to utilize the locality of each processor.

SUMMARY OF THE INVENTION

The object of the present invention is to provide an efficient resource management system and method in a multiprocessor system.

The foregoing object is accomplished by a multi-processor system, efficiently processing resources, comprising: memory means for storing a plurality of management tables each manages a resource and has a plurality of priority levels; setting means for setting the priority levels in each of the management tables; linking means for linking processible resources; and a plurality of processors connected via a bus, an arbitrary one of the processors, corresponding to a priority level for the arbitrary processor in each of the management tables, includes selecting means for selecting a resource corresponding to a highest of a plurality of priority levels for the arbitrary processor from the processible resources linked by the linking means, and executing means for processing the resource selected by the selecting means.

The foregoing object is further accomplished by a method of processing resources efficiently in a multiprocessor system causing processors linked via a bus to process resources, comprising: managing each of the resources by using management tables and storing the priority levels for processors that are ready to process resources; setting the priority levels in each of the management tables; linking processible resources; selecting a resource corresponding to the highest of priority levels for an arbitrary processor in the management table from the linked resources; and causing the arbitrary processor to process the selected resource.

With the above configuration, the resource management system and method of the present invention can not only make use of the locality of each cache memory, but also speed up the accessing operation, thereby achieving an efficient resource management.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Hereinafter, referring to the accompanying drawings, a first embodiment of the present invention will be explained.

Figure 1:
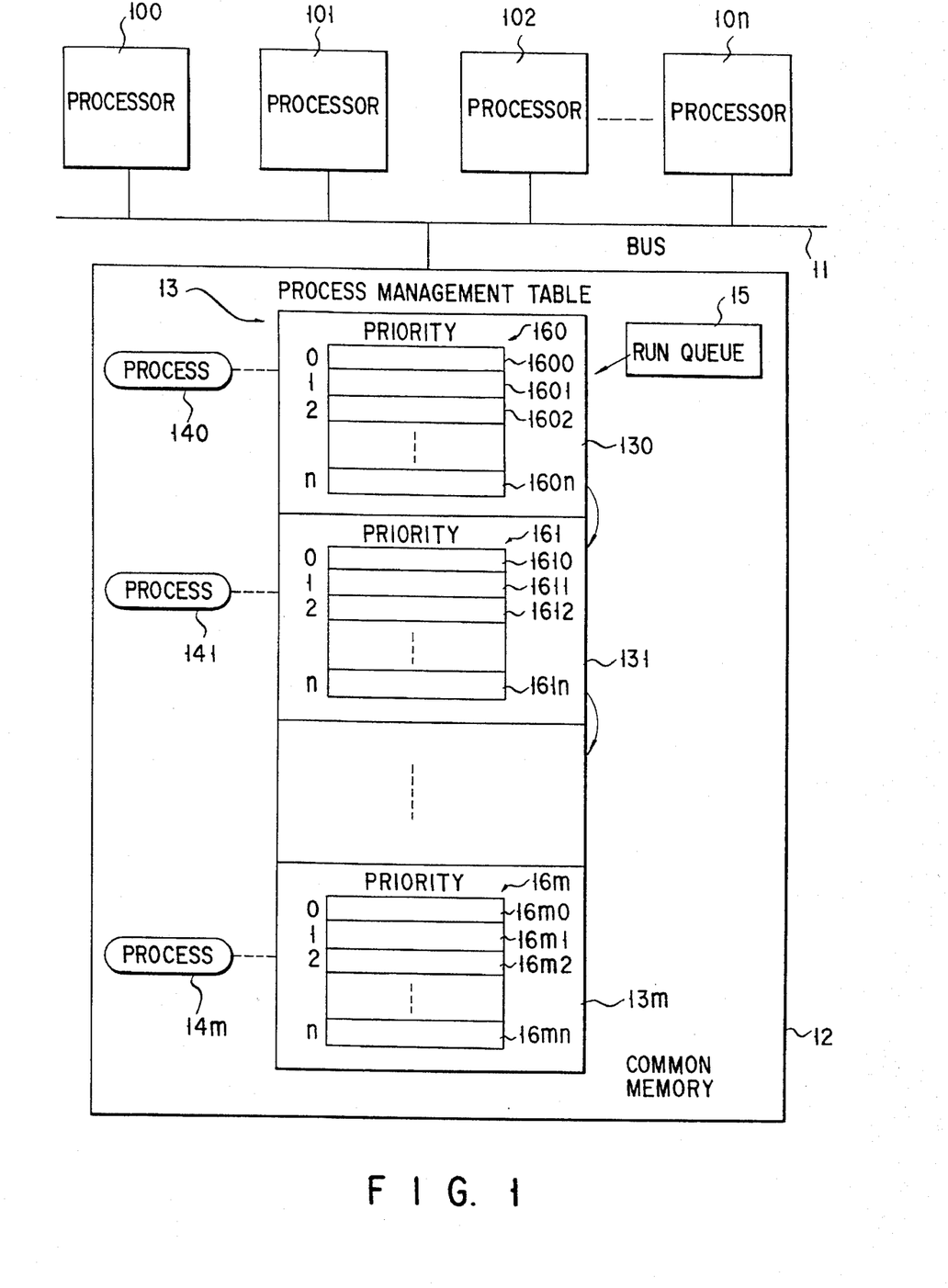
FIG. 1 is a block diagram of a resource management system according to a first embodiment of the present invention.

FIG. 1 is a block diagram of a resource management system of the first embodiment. Processors 100, 101, 102, . . . , 10n are connected to a common memory (or a shared memory) 12 via a bus 11, thereby forming a UMA (Uniform Memory Access)-type multiprocessor system, or a tightly coupled multiprocessor system. A process management table 13 contained in the common memory 12 is made up of process management table entries and is used to manage processes executed on the system. The individual process management table entries 130, 131, . . . , 13m are used to manage corresponding processes 140, 141, . . . , 14m, respectively. When there are executable processes on the system, those processes are linked to a run queue 15. Each processor selects a process to be executed from the processes linked to the run queue 15. The run queue 15 holds a queue of numbers of the processes to be executed. The executable process numbers set in the run queue 15 may be arranged (i) just one after another or (ii) in the order of descending priorities. When the executable process numbers are arranged just one after another, each processor checks all the processes for their priority, and executes the process of the highest priority first. When the process numbers set in the run queue 15 are arranged in the order of descending priorities, each processor executes the processes in the order in which the process numbers are set. Only the number of the process to be executed first may be set in the run queue 15, and the numbers of the processes to be executed after the first one may be used as linking information and put in the process management table. There are two linking methods in the linking information: (i) the executable process numbers are arranged just one after another and (ii) they are arranged in the order of descending priorities.

On the other hand, the process management table entries 130, 131, . . . , 13m each have a set of priority information items on the processors capable of executing the processes that those entries manage. Those sets are priority information sets 160, 161, . . . , 16m (m>n). The priority information sets 160, 161, . . . , 16m each have the priority of each of the processors 100, 101, . . . , 10n (there are n priorities, the same as the number of processors). For example, the process management table entry 131 that manages process 141 has priority information set 161. The priority information set 161 has the priorities 1610, 1611, 1612, . . . , 161n corresponding to processors 100, 101, . . . , 10n respectively. These priorities are given the same level as the initial value. They are controlled so that when the I/O is used by the operating system (OS), the level of priority may increase and when the CPU is used, the level of priority may decrease.

Here, it is assumed that among processes 140, 141, . . . , 14m, only three processes 140,141, and 14m are executable.

Of processors 100 through 10n, for instance, processor 100, before executing a process, sequentially checks the executable processes 140, 141, 14m (which are managed by the process management table entries 130, 131, 13m respectively) linked with the run queue 15 for the priorities 1600, 1610, 16m0 for processor 100. It then selects the process corresponding to the highest priority level.

Similarly, processor 101, before executing a process, sequentially checks the executable processes 140, 141, 14m (which are managed by the process management table entries 130, 131, 13m respectively) linked with the run queue 15 for the priorities 1601, 1611, 16m1 for processor 101. It then selects the process corresponding to the highest priority level.

Similarly, processor 10n, before executing a process, sequentially checks the executable processes 140, 141, 14m (which are managed by the process management table entries 130, 131, 13m respectively) linked with the run queue 15 for the priorities 160n, 161n, 16mn for processor 10n. It then selects the process corresponding to the highest priority level.

Each processor executes the thus selected process.

After a processor has executed a process, the priority level for the processor is raised in the process management table entry that manages the process, so that the process, when executed again, may tend to be executed by the same processor as much as possible. For example, after processor 101 has executed process 141, the level of the priority 1611 for the processor 101 is raised in the process management table entry 131. For the initial value for the priority, the level of the priority for any processor may be made equal after the execution of a process instead of raising the priority for the processor that has executed a process.

Figure 2:
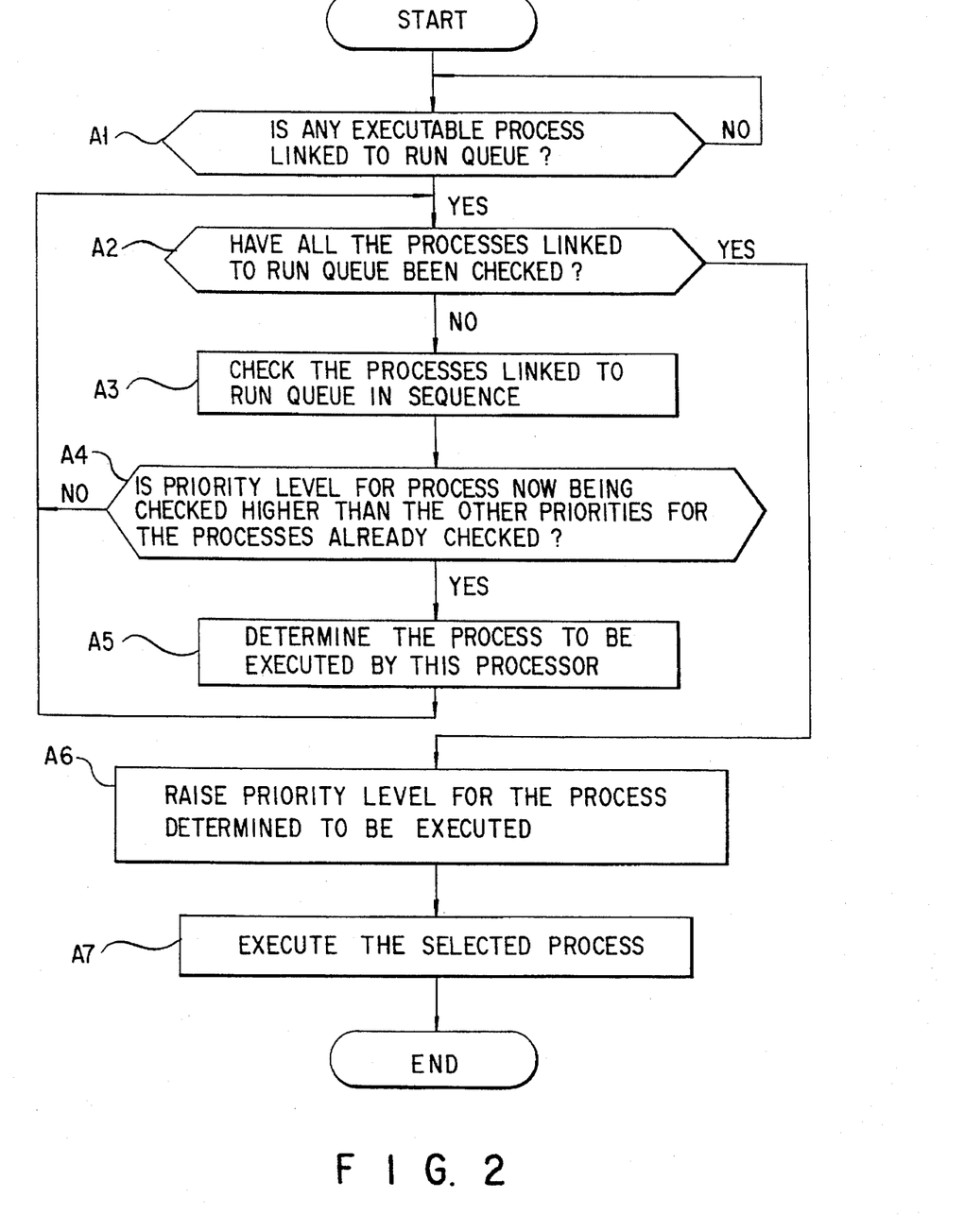
FIG. 2 is a flowchart for the operation of the resource management system of the first embodiment.

Hereinafter, referring to the flowchart in FIG. 2, the operation of the system of the first embodiment will be explained.

Each of processors 100 through 10n checks to see if there are any processes linked to the run queue 15. If no process is linked, the above check will be repeated (step A1). If a linked process is present, the processor will check to see if all the processes linked to the run queue 15 have been checked (step A2). If all of them have not been checked yet, the processor will sequentially check the processes linked to the run queue 15 (step A3). The processor compares the level of the priority for the process currently being checked with the highest of all the priority levels for the processes already checked, and judges whether the former is higher or not (step A4). If it is judged that the former is not higher, control will return to step A2. If it is judged that the priority value of the process currently being checked is higher, the process will be determined to be a process that the processor should execute and control will return to step A2 (step A5). At step A2, when all the processes have been checked, the level of the priority for the process that has been determined to be executed is raised (step A6). The processor executes the process (step A7). The process at step A6 may be performed after step A7.

Figure 3:
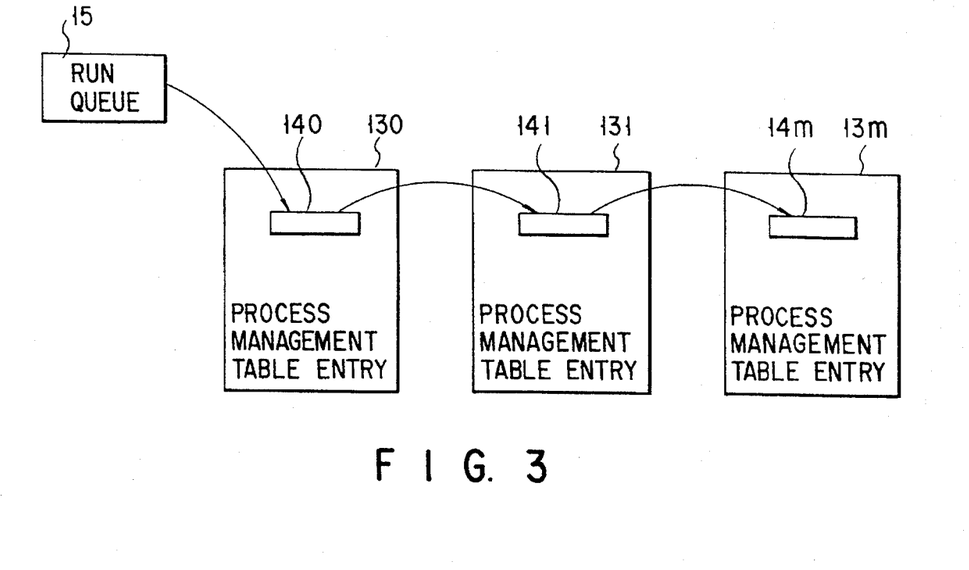
FIG. 3 shows a state in which processes are linked.

FIG. 3 shows a state in which executable processes 140, 141, 14m are linked to the run queue 15. The processes 140, 141, and 14m are managed by the process management table entries 130, 131, and 13m, respectively. Each process management table entry contains a field for linking processes. The address of a process to be searched next is specified in this field. The processor that is about to execute a process checks the processes 140, 141, 14m linked to the run queue 15 in sequence and refers to the priority (not shown) for itself in each process management table entry. The processor recognizes that the process corresponding to the highest of those priority levels referred to is a process that it should execute.

Figure 4:
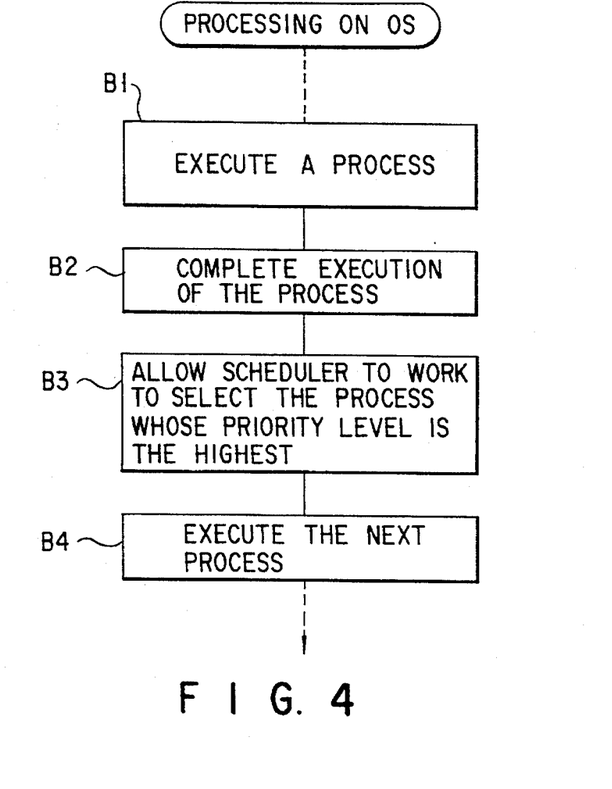
FIG. 4 is a flowchart for the processing on the operating system.

FIG. 4 shows the flow of processing on the operating system (OS). A processor is now executing a process (step B1). The execution of the process is completed and the time slice for the process has expired (step B2). Then, a scheduler works for a subsequent processor ready to execute a process and determines which one of the linked executable processes has the highest priority level (step B3). The processor waiting for execution executes the determined process (step B4). After the process has been executed, the scheduler works again, and determines a process that a subsequent processor should execute. On the OS, the above operation is repeated.

As explained in detail, in the first embodiment, after a processor has executed a process, the process, when executed again, is more likely to be executed by the same processor. This makes it possible to make use of the locality of each cache memory in the multiprocessor system, thereby achieving an efficient resource management system.

Figure 5:
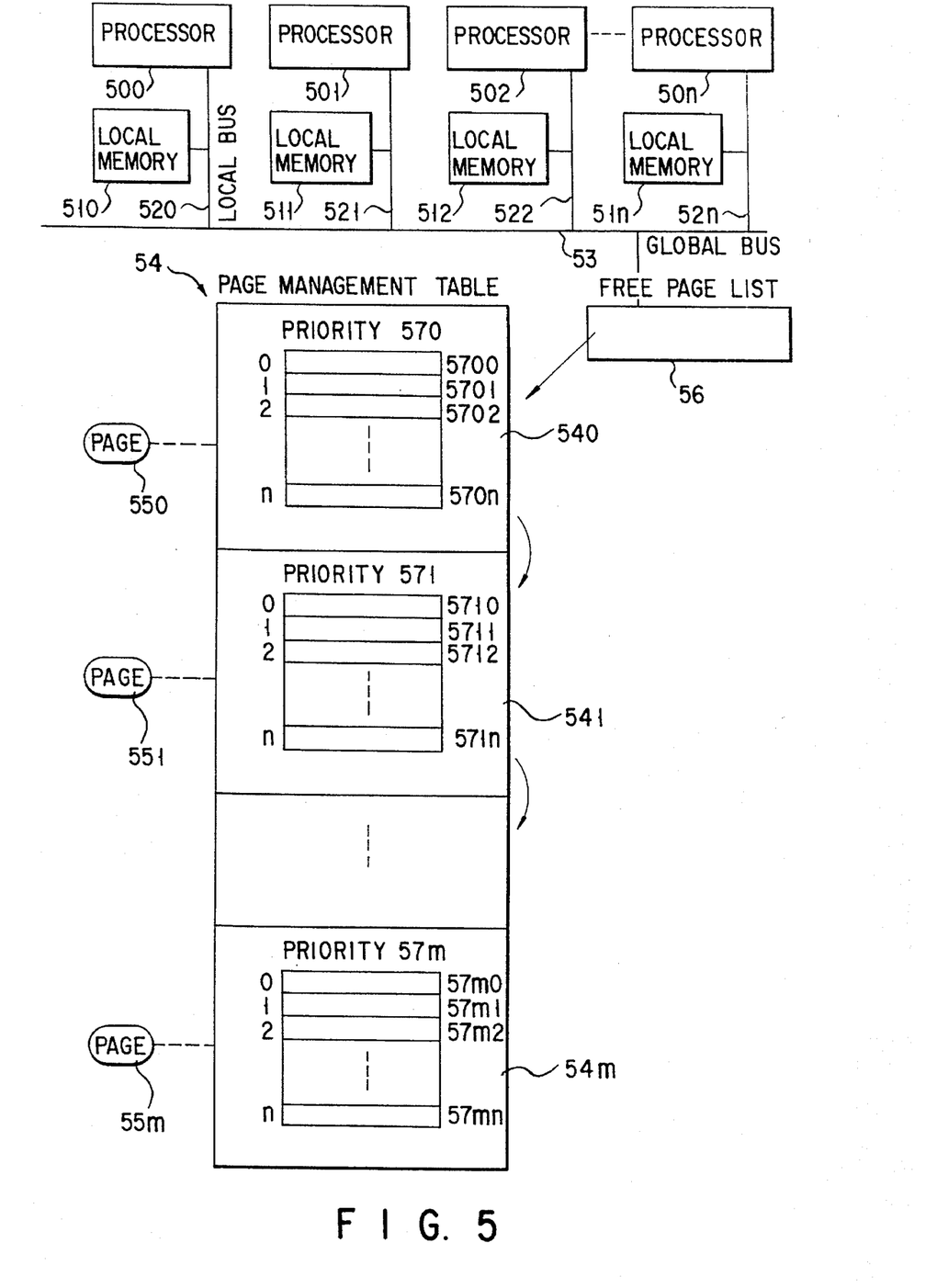
FIG. 5 is a block diagram of a resource management system according to a second embodiment of the present invention.

FIG. 5 is a block diagram of a resource management system according to a second embodiment of the present invention. This system is constructed so as to form a NUMA (No Uniform Memory Access)-type multiprocessor system, or a distributed shared memory-type multiprocessor system.

Local buses 520, 521, 522, . . . , 52n are connected to a global bus 53. The individual local buses are connected to processors 500, 501, 502, . . . , 50n, respectively. The processor 500 is connected to a local memory 510. The processor 501 is connected to a local memory 511. The processor 502 is connected to a local memory 512. Similarly, the processor 50n is connected to a local memory 51n. Each processor can access not only the local memory closest to itself, but also a remote memory. With this multiprocessor system, each processor accesses a local memory at a high speed and a remote memory at a low speed. For example, the processor 500 accesses the memory 510 at a high speed and the memory 511 at a low speed.

A page management table 54 manages the memories contained in the system. Page management table entries 540, 541, . . . , 54m manage the pages 550, 551, . . . , 55m contained in the system. Here, a page means a unit of memory allocation. When there are usable pages on the system, the page management table entries that manage those pages are linked to a free page list 56. Each processor selects a page to be used from the pages managed by the page management table entries linked to the free page list 56 to allocate pages to processes. The free page list 56 holds a queue of numbers of the pages to be used.

Each of the page management table entries 540, 541, . . . , 54m that manage memories has a set of priority information items for a processor that is about to allocate a page to a process. Those sets are priority information sets 570, 571, . . . , 57m (m>n). Each of the priority information sets 570, 571, . . . , 57m has priorities for processors 500, 501, . . . , 50n (there are n priorities, the same as the number of processors). For example, the page management table entry 541 that manages page 551 has priority information set 571. The priority information set 571 has priorities 5710, 5711, 5712, . . . , 571n corresponding to processors 500, 501, . . . , 50n respectively.

The values of those priorities are expressed as high or low. For the initially set value for the priority, the value of the priority corresponding to a page on a local memory of a processor is made high, and the value of the priority corresponding to a page on a remote memory is made low. As a result, each processor is controlled so as to access its local memory as much as possible, and to access a remote memory only when the local memory runs short of pages. Therefore, the system can, on the whole, achieve a high-speed accessing operation.

In contrast, because a conventional system does not have a page management table containing priorities corresponding to the individual processors, a remote memory is accessed although a local memory still has a blank page, resulting in inefficient use of memory.

It is assumed that among pages 550, 551, . . . , 55m, only three pages 550, 551, 55m are usable.

Of processors 500 through 50n, for instance, processor 500 that is about to allocate a page to a process sequentially checks the usable pages 550, 551, 55m (which are managed by the page management table entries 540, 541, 54m respectively) linked to the free page list 56 for the priorities 5700, 5710, 57m0 for processor 500. It then selects the page corresponding to the priority value made high first. when no priority value is high, a page corresponding to a low priority value is selected.

Similarly, processor 501 sequentially checks the usable pages 550, 551, 55m (which are managed by the page management table entries 540, 541, 54m respectively) linked to the free page list 56 for the priorities 5701, 5711, 57m1 for processor 501. It then selects the page corresponding to the priority value made high first. When no priority value is high, a page corresponding to a low priority value is selected.

Similarly, processor 50n sequentially checks the usable pages 550, 551, 55m (which are managed by the page management table entries 540, 541, 54m respectively) linked to the free page list 56 for the priorities 570n, 571n, 57mn for processor 50n. It then selects the page corresponding to the priority value made high first. When no priority value is high, a page corresponding to a low priority value is selected.

Because the individual processors 500, 501, 502, . . . , 50n, when allocating pages to processes, select pages in the order of descending priorities, if processes move less frequently between processors, a processor will access a local memory more frequently, thereby enabling an efficient memory management. To cause processes to move less frequently between processors, a process management as explained in the first embodiment is effected.

Figure 6:
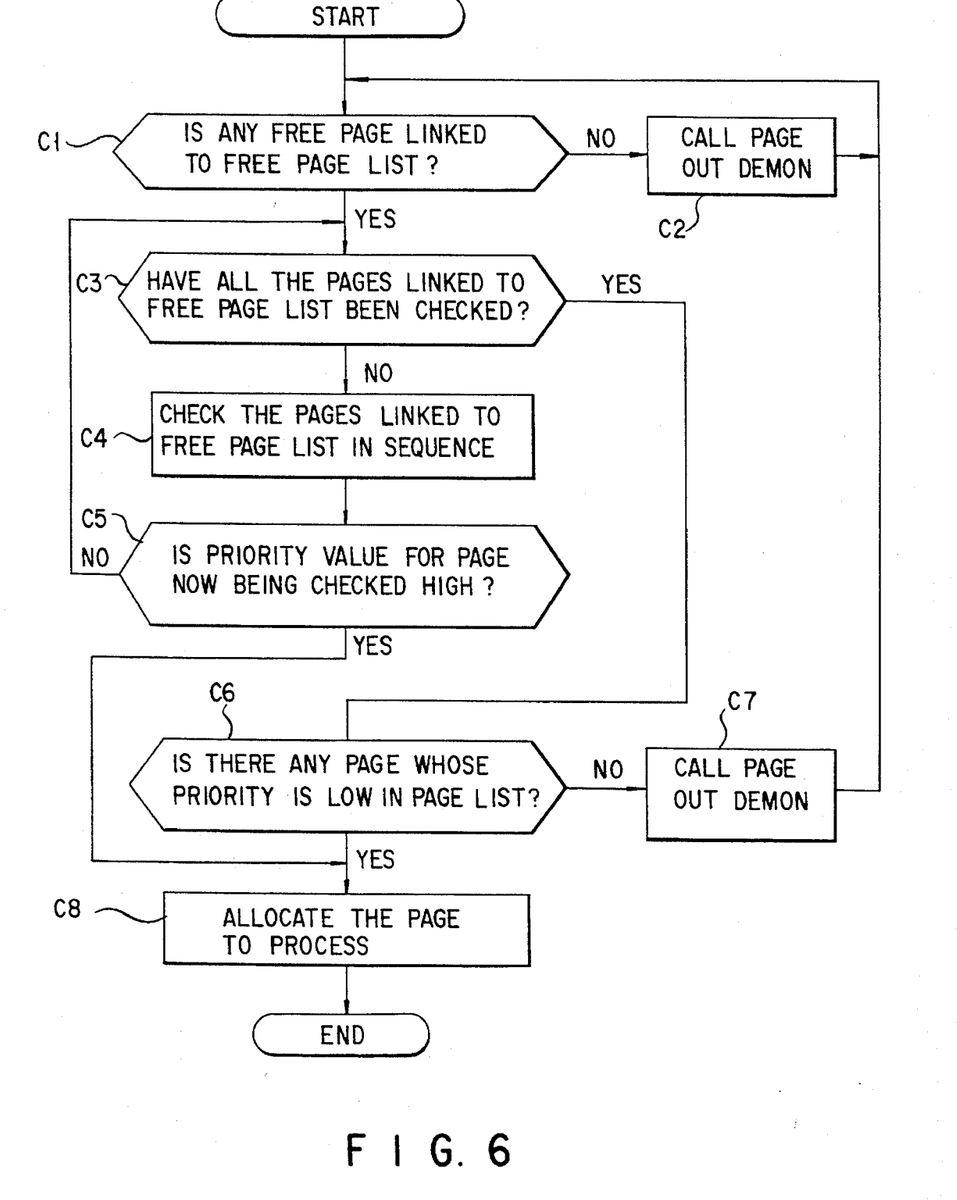
FIG. 6 is a flowchart for the operation of the resource management system according to the second embodiment.

Hereinafter, the operation of the system of the second embodiment will be explained with reference to the flow-chart in FIG. 6.

Each processor checks to see if any free page is linked to the free page list (step C1). If no free page is linked, the processor will call a page out demon (a process performed in the background to carry out a page out process) and repeat the operation at step C1 (step C2). If a free page is linked, the processor will check to see if all the pages linked to the free page list have been checked (step C3). If all of them have not been checked yet, the processor will sequentially check the pages linked to the free page list (step C4). Then, the processor checks to see if the value of the priority related to the page now being checked is high. If the value is not high, step C3 will be repeated (step C5). At step C3, when the checking of all the pages has been completed, the processor checks to see if there-is any page whose priority value is low in the free page list (step C6). If such a page is not present, the processor will call the page out demon and repeat step C1 (step C7). If such a page is present, the processor will allocate the page to a process. At step C5, if the value of the priority is high, the page being checked will also be allocated to a process (step C8).

Next, a third embodiment of the present invention will be explained.

Figure 7:
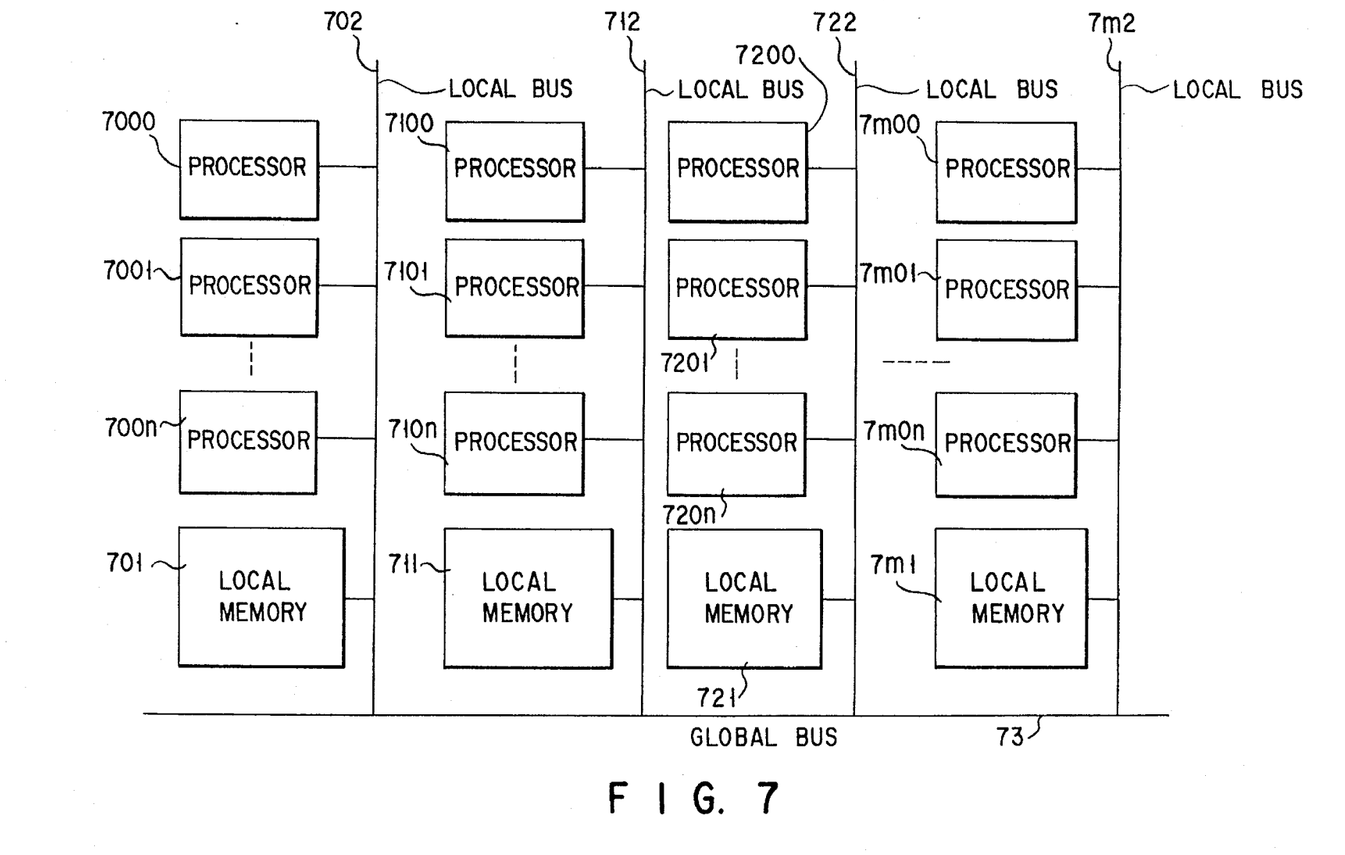
FIGS. 7 and 8 are block diagrams of a resource management system according to a third embodiment of the present invention.

FIG. 7 is a block diagram of a resource management system according to a third embodiment of the present invention. As in the second embodiment, the system is constructed so as to form a NUMA (No Uniform Memory Access)-type multiprocessor system. This system differs from that of the second embodiment in that a plurality of processors are connected to each local memory. In this embodiment, a plurality of processors connected to the same local bus are defined as a node. The individual processors in a node are given the same priority level. Namely, in the embodiment, a priority level is given node by node.

Local buses 702, 712, 722, . . . , 7m2 are connected to a global bus 73. The local bus 702 is connected to processors 7000, 7001, . . . , 700n. The local bus 712 is connected to processors 7100, 7101, . . . , 710n. The local bus 722 is connected to processors 7200, 7201, . . . , 720n. The local bus 7m2 is connected to processors 7m00, 7m01, . . . , 7m0n. The processors 7000, 7001, . . . , 700n are connected to a local memory 701. The processors 7100, 7101, . . . , 710n are connected to a local memory 711. The processors 7200, 7201, . . . , 720n are connected to a local memory 721. Similarly, the processors 7m00, 7m01, . . . , 7m0n are connected to a local memory 7ml. Each processor can access not only the local memory closest to itself, but also a remote memory. With this multiprocessor system, each processor accesses a local memory at a high speed and a remote memory at a low speed. For example, the processor 7000 accesses the memory 701 at a high speed and the memory 711 a low speed.

Figure 8:
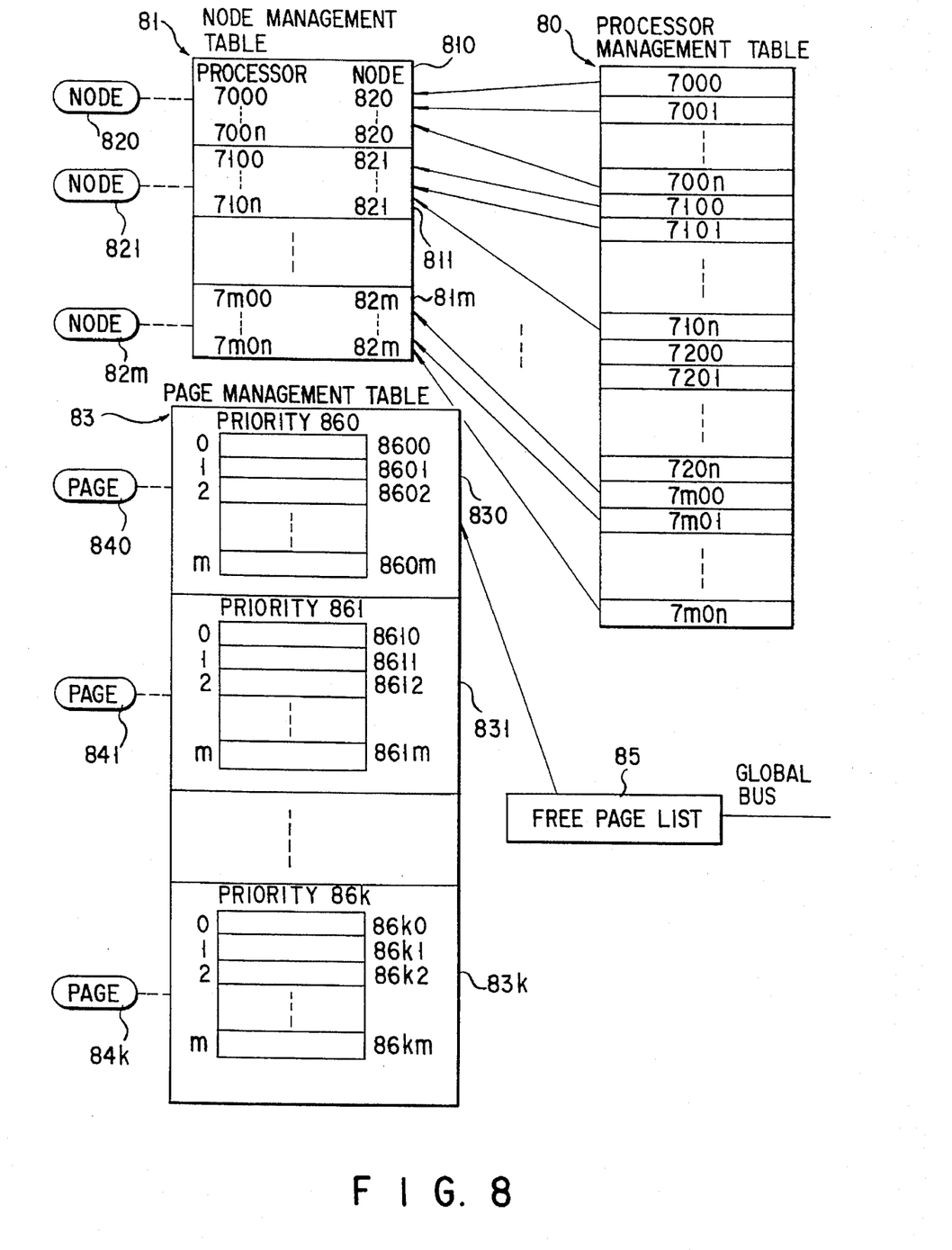

In FIG. 8, a processor management table 80 holds the processor IDs of the processors existing in the system. In a node management table 81, a group of processors connected to the same local bus is defined as a node. The reason for this is to simultaneously deal with a group of processors whose access time to a bus is the same. In an entry 810 in the node management table 81, processors 7000, 7001, . . . , 700n are defined as a node 820. In an entry 811 in the node management table, processors 7100, 7101, . . . , 710n are defined as a node 821. In an entry 81m in the node management table, processors 7m00, 7m01, . . . , 7m0n are defined as a node 82m.

A page management table 83 manages memories that the system has. Page management table entries 830, 831, . . . , 83k manage pages 840, 841, . . . , 84k that the system has. When there are usable pages on the system, the page management table entries that manage those pages are linked to the free page list 85. Each processor selects a page to be used from the pages managed by the page management table entries linked to the free page list 85 to allocate a page to a processor. The free page list 85 holds a queue of numbers of the pages to be used.

Each of the page management table entries 830, 831, . . . , 83k has a set of priority information items on a processor that is about to allocate a page to a process. Those sets are priority information sets 860, 861, . . . , 86k (k>m). Each of the priority information sets 860, 861, . . . , 86k has priorities for nodes of processor groups 820, 821, . . . , 82m (there are m priorities, the same as the number of nodes). For example, the page management table entry 831 that manages page 841 has priority information set 861. The priority information set 861 has priorities 8610, 8611, 8612, . . . , 861m corresponding to nodes 820, 821, . . . , 82m respectively.

The values of those priorities are expressed as high or low. For the initially set value for the priority, the value of the priority corresponding to a page on a local memory of a processor is made high, and the value of the priority corresponding to a page on a remote memory is made low.

It is assumed that among pages 840, 841, . . . , 84k, only three pages 840, 841, 84k are usable.

Of processors 7000 through 7m0n, for instance, processor 7000 (in node 820) that is about to allocate a page to a process sequentially checks the usable pages 840, 841, 84k (which are managed by the page management table entries 830, 831, 83k respectively) linked to the free page list 85 for the priorities 8600, 8610, 86k0 for processor 7000. It then selects the page corresponding to the priority value made high first. When no priority value is high, a page corresponding to a low priority level is selected.

Similarly, processor 7100 (in node 821) that is about to allocate a page to a process sequentially checks the usable pages 840, 841, 84k (which are managed by the page management table entries 830, 831, 83k respectively) linked to the free page list 85 for the priorities 8600, 8610, 86k0 for processor 7100. It then selects the page corresponding to the priority level made high first. When no priority value is high, a page corresponding to a low priority value is selected.

Similarly, processor 7m00 (in node 82m) that is about to allocate a page to a process sequentially checks the usable pages 840, 841, 84k (which are managed by the page management table entries 830, 831, 83k respectively) linked to the free page list 85 for the priorities 860m, 861m, 865m for processor 7m00. It then selects the page corresponding to the priority level made high first. When no priority value is high, a page corresponding to a low priority value is selected.

Because the individual processors 7000 through 7m0n, when allocating pages to processes, select pages in the order of descending priorities, if processes move less frequently between processors, a processor will access a local memory more frequently, thereby enabling an efficient memory management. To cause processes to move less frequently between processors, a process management as explained in the first embodiment is effected.

As has been explained in detail, with the second and third embodiments, after a processor has allocated a page to a process, the page, when being used again, is more likely to be used by the same processor. Consequently, in the multiprocessor system, each processor accesses its own local memory as frequently as possible, thereby achieving a high-speed accessing operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A multiprocessor system comprising:

a plurality of executable resources;

a plurality of processors, each of which selecting one resource from said plurality of executable resources and processing the selected resource;

memory means for storing for each of the executable resources separate priority levels for each of the processors;

resource selection means for selecting a resource to be processed by each of the processors from among the executable resources, on the basis of the priority levels stored in the memory means associated with each of the resources for each of the processors; and priority level setting means for, when one of the processors processes the resource selected by said resource selection means, raising a priority level of the selected resource for that processor, leaving priority levels of not selected executable resources unchanged.

2. A multiprocessor system according to claim 1, wherein said resource selection means causes each of the processors to select a resource which has a highest priority level for that processor from among the executable resources.

3. A multiprocessor system according to claim 1, wherein said executable resources are processes.

4. A multiprocessor system according to claim 1, wherein said executable resources are pages of a memory.

5. A method for causing a plurality of processors to process a plurality of executable resources, the method comprising the steps of:

storing for each of the executable resources priority levels for each of the processors;

permitting each of the processors to select a resource based on the priority levels;

permitting each of the processors to process the selected resource; and when one of the processors processes the selected resource, raising a priority level of the selected resource for that processor, leaving priority levels of not selected resources unchanged.

6. A method according to claim 5, wherein said resource selection permitting step causes each of the processors to select a resource which has a highest priority level for that processor from among the executable resources.

7. A method according to claim 5, wherein said executable resources are processes.

8. A method according to claim 5, wherein said executable resources are pages of a memory.

9. A multiprocessor system comprising:

a plurality of memories each having a plurality of pages, some of said pages being available for use;

a plurality of processors each of which selecting at least one page from said pages available for use;

memory means for storing priority levels of the pages available for use for each of the processors;

page selection means for selecting a page to be used by each of the processors from among the pages available for use, on the basis of the priority levels stored in the memory means; and means for, when one of the processors uses the page selected by said page selection means, raising a priority level of the selected page for that processor, leaving priority levels of not selected pages unchanged.

10. A method for causing a plurality of processors to use one of a plurality of pages available for use, in a system including a plurality of processors and a plurality of memories each having a plurality of pages available for use, the method comprising the steps of:

storing for each of the pages available for use priority levels for each of the processors;

permitting each of the processors to select a page based on the priority levels;

permitting each of the processors to use the selected page; and, when one of the processors uses a page, raising a priority level of said used page for that processor, leaving priority levels of other pages unchanged.

11. A multiprocessor system comprising:

a plurality of memories each having pages, a plurality of said pages being available for use;

a plurality of nodes having processors, each of the processors selecting at least one page from a plurality of pages available for use;

memory means for storing priority levels of the pages available for use for each of the nodes;

page selection means for selecting a page to be used by each of the processors from among the pages available for use, on the basis of the priority levels stored in the memory means associated with each of the pages for each of the nodes; and means for, when one of the processors uses the page selected by said page selection means, raising a priority level of the selected page for that processor, leaving priority levels of not selected pages unchanged.

12. A method, in a system including a plurality of nodes each having a plurality of processors and a plurality of memories each having pages, some of said pages being available for use, for causing the plurality of processors to use one of the pages available for use, the method comprising the steps of:

storing for each of the pages available for use separate priority levels for each of the nodes;

permitting each of the processors to select a page based on the priority levels that each of the pages available for separate use has for that node;

permitting each of the processors to use the selected page; and, when one of the processors uses a page, raising a priority level of said used page for that processor, leaving priority levels of other pages unchanged.

* * * * *